Sept. 13, 1949.  A. H. DEVLYN  2,481,828
NUT LOCK
Filed May 9, 1946
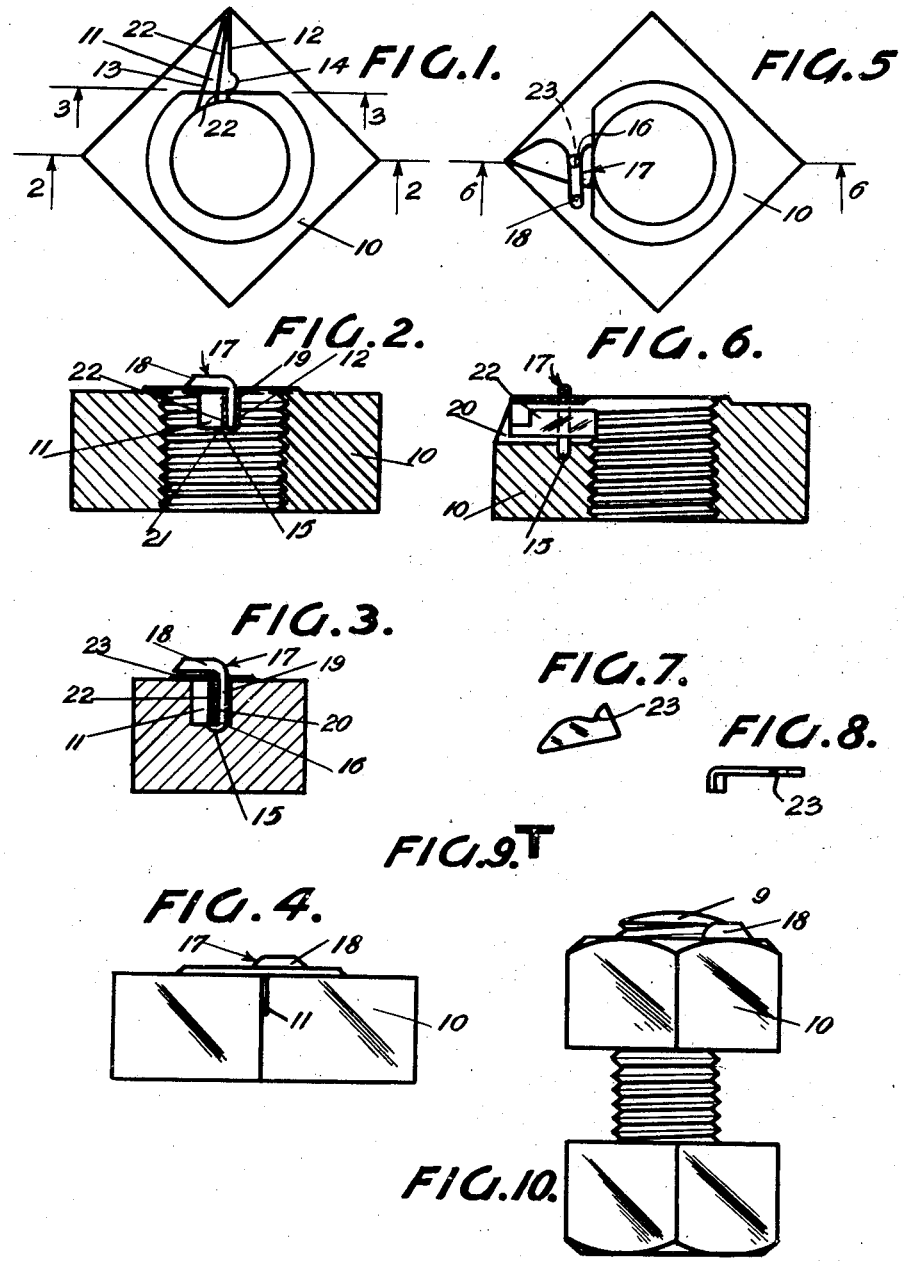
ARTHUR HENRY DEVLYN
INVENTOR
By (signature)
his Att'y.

Patented Sept. 13, 1949

2,481,828

UNITED STATES PATENT OFFICE 2,481,828

NUT LOCK

Arthur Henry Devlyn, Lithgow, New South Wales, Australia, assignor of one-fourth to Charles Aynan Pevitt, Lithgow, New South Wales, Australia Application May 9, 1946, Serial No. 668,554
In Australia May 23, 1945

1 Claim. (Cl. 151—25)

This invention relates to improved means for locking nuts upon bolts by means of a fin brought into engagement with the thread of the bolt.

Many nut locks have been proposed, but in their manufacture difficulties have arisen or they have been impracticable.

An object of the present invention is to provide an improved nut lock which may be easily manufactured by mass production methods, such as by stamping or drop forging.

According to the present invention, during the stamping or forming process a hole or socket is formed in one or other of the four diagonal corners of the nut and intersecting the said hole at right angles to the axis thereof a V-shaped slot is formed.

A key having a flat thereon forming a hooked end is positioned in the socket and a fin is placed in the slot with one face lying against the flat portion of the key.

The fin projects into the path of the thread of the nut but is capable of being moved clear thereof by a partial rotation of the key.

The key is held in place by the fin engaging the hook thereof and the top of the slot is closed by a cover plate which fits round the key and is pressed into position in the slot or is secured by welding or other means. The said plate excludes foreign matter from the slot and holds the key and fin in position.

The key has a handle or turn lever outside the slot by means of which the fin is brought into and out of engagement with the surface of the thread of the bolt upon which the nut is threaded. The position of the fin in the slot is such that the latter makes an angle of approximately 10° to a radius of the bolt.

In order that the invention may be more readily understood reference will now be made to the accompanying drawings wherein:

Figure 1 is a plan of a nut fitted according to the present invention, with the cover plate and key removed.

Figure 2 is a section on the line 2—2 of Figure 1, but with the cover plate in position.

Figure 3 is a sectional view on the line 3—3 of Figure 1 but with the cover plate in position.

Figure 4 is an elevational view of a nut fitted with the present invention.

Figure 5 is a plan vew of a nut fitted with the present invention and having the cover plate in position.

Figure 6 is a sectional view on the line 6—6 of Figure 5 showing the fin, key, and cover plate in position.

Figure 7 is a plan of the cover plate.

Figure 8 is an elevational view thereof.

Figure 9 is an end view thereof, and

Figure 10 illustrates a bolt and nut in accordance with the present invention.

The nut 10 of the bolt 9 during the formation thereof by the act of stamping or forming has a V-shaped tapered slot 11 formed upon its upper face at one of the diagonal corners thereof, one of the faces 12 of the said slot 11 being formed in alignment with a radius of the bolt 9 the other face 13 of the said slot 11 being disposed at an angle to the said face 12, a hole 14 being formed during the said act of stamping or forming of the nut, said hole 14 extending inwardly of the nut to form a socket 15 in which the lower end 16 of a key 17 is seated, said hole 14 being disposed medially of the face 12.

The key 17 has an operating arm 18 and a stem 19 with a flat face 20 formed thereon, the lower end 16 of the stem 19 being seated in the socket 15 and forming with a flat face 20, a hooked portion 21.

A fin 22 which is of spring steel and is chisel edged is disposed in the V-shaped slot 11 and normally lies flat with the radial face 12 and also engages the flat face 20 formed upon the key 17, the fin 22 being longer than the said face 12, but not longer than the said face 13.

The fin 22 is held in the nut at the apex of the V-shaped slot 11 and is free at its opposite end; medially the said fin 22 rests upon the hooked portion 21.

A cover plate, see Figs. 7, 8 and 9, having a semi-circular hole 23 to fit around the stem 19 of the key 17, is provided to retain the fin in the V-shaped groove. This cover plate may be pressed into position or may have a securing tongue which enters the V slot at the apex.

In use the fin 22 acts as a ratchet pawl with respect to the nut 10 and bolt permitting the nut to turn in one direction but not in the opposite direction until the key 17 is turned by the operating arm 18 so that instead of the flat face 20 engaging the fin 22 the round part of the stem 19 engages it and forces it towards the face 13 of the V-shaped slot 11 clear of engagement with the bolt.

I claim:

An improved nut lock having a V-shaped tapered slot formed in the upper face of the nut at one of its diagonal corners during the stamping or forming operation, one of the faces of said slot being perpendicular to the axis of the nut, the other face of the said slot being disposed at an angle to the first mentioned face, a hole formed in the nut to extend inwardly thereof to produce a socket, a key in said socket, said hole being disposed medially of and intersecting the said first mentioned face, a fin secured in the said slot, said key having a stem with a flat face formed thereon engaging the side of said fin, the lower end of the stem being seated in the said socket and having a hooked portion for engaging the bottom of said fin, said fin together with the key being held in position by a cover plate secured in the said stamped recess.

ARTHUR HENRY DEVLYN.

REFERENCES CITED

The following references are of record in the file of this patent:

UNITED STATES PATENTS

| Number | Name | Date |
| --- | --- | --- |
| 264,933 | Deeds | Sept. 26, 1882 |
| 548,556 | Kaldrider | Oct. 22, 1895 |

Certificate of Correction

Patent No. 2,481,828 September 13, 1949

ARTHUR HENRY DEVLYN

It is hereby certified that errors appear in the printed specification of the above numbered patent requiring correction as follows:

In the grant, lines 2 and 3, for "Charles Aynan Pevitt Lithgow, of" read *Charles Aynan Pevitt, of Lithgow,*; line 13, for "Charles Aynan Pevitt Lithgow" read *Charles Aynan Pevitt*;

and that the said Letters Patent should be read with these corrections therein that the same may conform to the record of the case in the Patent Office.

Signed and sealed this 7th day of February, A. D. 1950.

[SEAL]

THOMAS F. MURPHY,
*Assistant Commissioner of Patents.*